United States Patent [19]

Oetiker

[11] 4,106,799
[45] Aug. 15, 1978

[54] AT LEAST TWO-PARTITE CLAMPING SLEEVE FOR CONNECTION OF TWO PIPE ENDS PROVIDED WITH FLANGES

[76] Inventor: Hans Oetiker, Oberdorfstrasse 21, 8810 Horgen, Switzerland

[21] Appl. No.: 667,942

[22] Filed: Mar. 18, 1976

[30] Foreign Application Priority Data

Mar. 19, 1975 [CH] Switzerland .......................... 3481/75

[51] Int. Cl.² .......................... F16L 17/00; F16L 19/00; F16L 21/02; F16L 23/00
[52] U.S. Cl. ..................................... 285/365; 24/20 R
[58] Field of Search ............... 285/365, 366, 367, 252, 285/405; 24/21, 22, 23 R, 270, 20

[56] References Cited

U.S. PATENT DOCUMENTS

| | | | |
|---|---|---|---|
| 2,709,094 | 5/1955 | Polanski | 285/407 |
| 2,862,275 | 12/1958 | Kessler | 24/270 |
| 2,869,211 | 1/1959 | Kessler et al. | 24/270 |
| 3,042,430 | 7/1962 | Guy | 285/365 |
| 3,321,811 | 5/1967 | Thomas | 285/252 X |
| 3,470,589 | 10/1969 | Bauman et al. | 24/23 R |

*Primary Examiner*—Wayne L. Shedd
*Attorney, Agent, or Firm*—Craig & Antonelli

[57] ABSTRACT

An at least two-partite clamping sleeve for connecting pipe ends provided with flanges, in which the clamping sleeve includes an open one-piece or multi-partite ring that includes inner side surfaces inclined in relation to the ring axis for abutment at the pipe ends, and a cylindrical outer surface connecting the lateral surfaces; the mutually opposite free ends of the open ring are provided with outwardly projecting hooks or with slots while one or several connecting members with an ear-like bulge are used whose ends are provided with slots or hooks for engagement with the hooks or slots, respectively, of the free ring ends.

1 Claim, 8 Drawing Figures

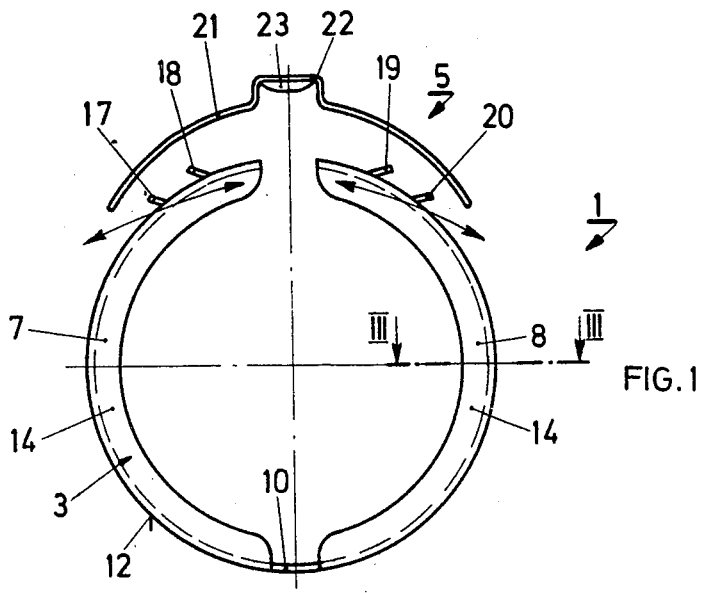
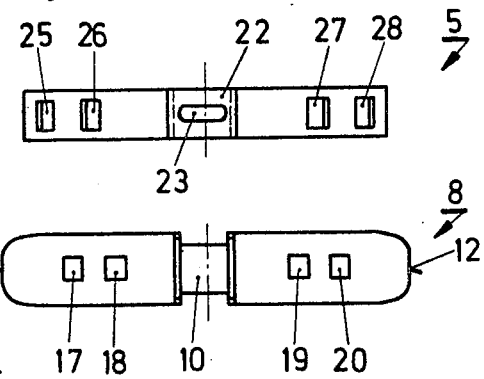
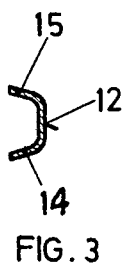
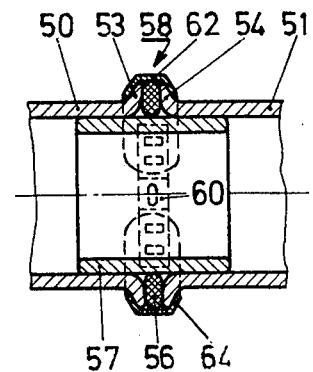
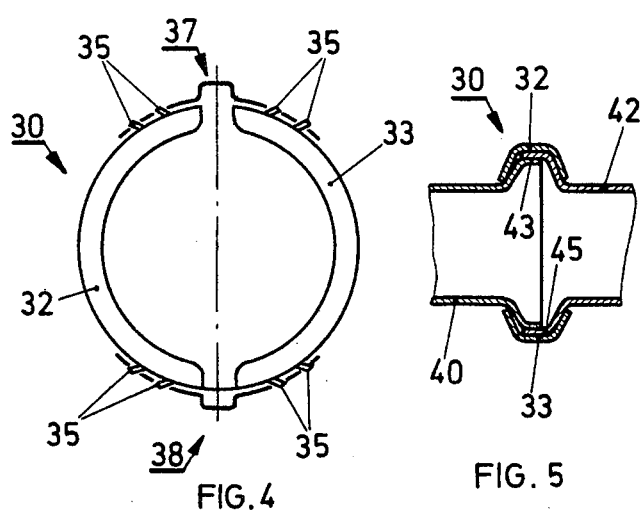
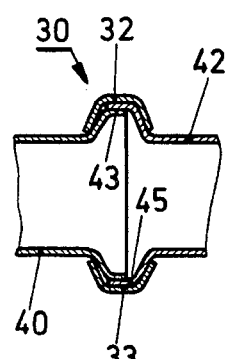
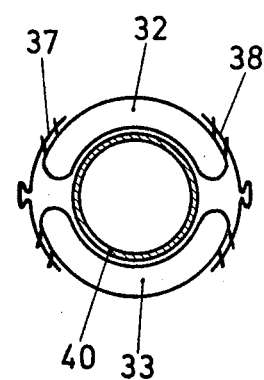

AT LEAST TWO-PARTITE CLAMPING SLEEVE FOR CONNECTION OF TWO PIPE ENDS PROVIDED WITH FLANGES

The present invention relates to an at least two-partite clamping sleeve for connecting two pipe ends provided with flanges.

Pipe connections by means of clamping sleeves are known in the art, in which the clamping sleeve is constructed as ring with at least one ear-like bulge which is contractable under permanent deformation for the purpose of tightening the clamping sleeve. The prior art thereby utilizes one-piece rings which can be utilized only once, and whose disengagement requires the clamping sleeve to be cut open, i.e., be rendered useless. These prior art clamping sleeves are provided especially for small pipe diameters.

The present invention aims at the provision of a clamping sleeve for the connection of pipe parts of larger diameter, as occur, for example, in exhaust pipes of motor vehicles, whereby these clamping sleeves by reason of their size and therewith of their price, must be reusable.

In this sense, the clamping sleeve according to the present invention is characterized in that the sleeve includes an open unitary (one-piece) or multi-partite ring which for purposes of abutment at the pipe ends includes internal side surfaces inclined in relation to the ring axis and a cylindrical outer surface connecting these side surfaces, whereby the mutually opposite free ends of the open ring are provided with outwardly projecting hooks pointed away from one another or with slots, and in that they include additionally one or more connecting members whose ends are provided with slots or hooks, respectively, for engagement with the hooks or the slots of the free ring ends as well as with one ear-like bulge each.

By reason of the fact that in particular the one-piece ring includes in its center area a place receptive to bending which acts as stiff hinge, the one-piece ring can be spread apart and compressed without damage for purposes of assembly and disassembly. Consequently, it can be used several times.

A preferred embodiment of the clamping sleeve of the present invention additionally provides that the pliable or bendable place that is receptive to bending is constructed as annealed outer surface portion within the area of which the side surfaces are interrupted. Such a type of hinge place is simple and can be manufactured in a very small area.

If in particular the connecting member consists of considerably thinner steel band than the ring, then the expendable parts of this connection become very inexpensive whereas the costly rings are re-usable.

It is advantageous for large diametric pipe connections if the clamping sleeve includes a multi-partite ring and several connecting members.

A ring of iron and a connecting member of stainless steel have proved as a construction particularly in demand for rigidity and strength reasons.

Accordingly, it is an object of the present invention to provide a clamping sleeve consisting of at least two separate parts for connecting two pipe ends provided with flanges which avoids by simple means the aforementioned shortcomings and drawbacks encountered in the prior art.

Another object of the present invention resides in a multi-partite clamping sleeve for connecting pipe ends provided with flanges which can be re-used by enabling repeated installation and disassembly thereof.

A further object of the present invention resides in a multi-partite clamping sleeve for connecting pipe ends in which the opening of the pipe connection does not require a destruction of expensive parts.

Still a further object of the present invention resides in a connection of pipe ends provided with flanges by means of a clamping sleeve, which is applicable also to connections of pipe parts of large diametric dimension.

Another object of the present invention resides in a multi-partite clamping sleeve for connecting pipe ends of the type described above which effectively provides a hinge-like place to facilitate the installation and removal thereof.

A further object of the present invention resides in a pipe connection of the type described above which is simple in construction, reliable in operation, and relatively inexpensive insofar as the ultimate user is concerned.

A further object of the present invention resides in a pipe connection of the type described above in which the relatively expensive parts are so constructed and arranged as to be re-usable while only relatively inexpensive parts are used as destructable or throw-away parts.

These and other objects, features and advantages of the present invention will become more apparent from the following description when taken in connection with the accompanying drawing which shows, for purposes of illustration only, several embodiments in accordance with the present invention, and wherein:

FIG. 1 is a side elevational view of a two-partite clamping sleeve with a one-piece ring and with a connecting member in the non-assembled condition;

FIG. 2 is a top plan view on the clamping sleeve according to FIG. 1 with the connecting member shown laterally offset with respect thereto;

FIG. 3 is a cross-sectional view through the unitary ring according to line III—III of FIG. 1;

FIG. 4 is a somewhat schematic side elevational view of a clamping sleeve with a two-partite ring and with two connecting members connecting these two parts, illustrating the various parts in the conditions in which the parts thereof are fitted together;

FIG. 5 is a longitudinal cross-sectional view through the clamping sleeve according to FIG. 4, illustrating the various parts in the installed position;

FIG. 6 is a somewhat schematic side elevational view of the connection according to FIG. 5;

FIG. 7 is a longitudinal cross-sectional view through a connection in accordance with the present invention of pipes with large diametric dimension.

Figure 8:
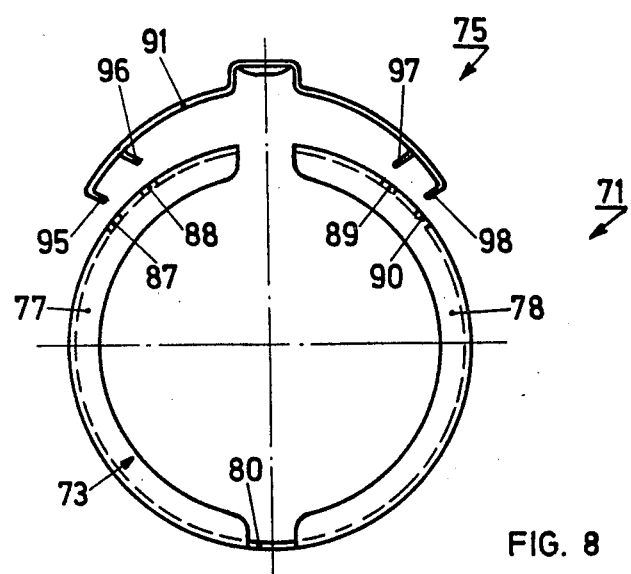
FIG. 8 is a side elevational view of a modified embodiment similar to FIG. 1, of a two-partite clamping sleeve with a single connecting member in which, however, the cooperating hooks and slots are interchanged.

Referring now to the drawing wherein like reference numerals are used throughout the various views to designate like parts, and more particularly to FIGS. 1 and 2, a clamping sleeve generally designated by reference numeral 1 is illustrated in these two figures which consists of a unitary, one-piece ring generally designated by reference numeral 3 and of a connecting member generally designated by reference numeral 5. The ring 3 includes two clamping jaws 7 and 8 which are connected with each other by a hinge portion 10. The hinge portion 10 is annealed so that it allows a pressing apart and a pressing together of the two clamping jaws 7 and 8 without breakage which characterizes the unitary ring 3 as re-usable element. The two clamping jaws 7 and 8 have an outer surface 12 (FIGS. 1 and 3) and two lateral side surfaces 14 and 15 (FIG. 3) adjoining the outer surface 12. These two side surfaces 14 and 15 are inclined so as to converge in the outer direction. They include a so-called taper providing a tightening action on the pipe ends. Within the area of their free ends, the clamping jaws 7 and 8 are equipped with hooks 17, 18, 19 and 20 which are obtained by stamping or punching the same out of the clamping jaws 7 and 8 and which are pressed out so as to point outwardly.

The connecting member 5 consists of a band portion 21 which is formed in its center part into an ear-shaped bulge 22 which for purposes of stability and rigidity is provided with a longitudinal groove 23. The band portion 21 includes on both sides of this bulge 22, two slots 25, 26, 27 and 28 each, corresponding to the hooks 17 to 20.

A four-partite clamping sleeve generally designated by reference numeral 30 is illustrated in FIGS. 4 to 6, whose ring consists of two independent clamping jaws 32 and 33 which are provided with corresponding hooks 35. The clamping jaws 32 and 33 are combined into a closed structure by means of connecting members generally designated by reference numerals 37 and 38 as illustrated in FIG. 4. The construction of the clamping jaws 32 and 33 is from a cross-sectional point of view the same as that of the clamping jaws 7 and 8 of the two-partite clamping sleeve of FIGS. 1 to 3. Also the hooks are provided in an analogous manner whereby, however, two hook pairs each are provided per clamping jaw, and correspondingly two connecting members 37 and 38 are provided with slots corresponding to the slots 25 to 28.

FIG. 5 illustrates two pipe parts 40 and 42 to be connected, whose ends are provided with flanges 43 and 45, whereby the two pipe ends 40 and 42 are connected with each other with the aid of the flanges 43 and 45 and with the use of the clamping sleeve in accordance with the present invention. This takes place as can be seen from FIG. 6 in that the two clamping jaws 32 and 33 are placed about the assembled flanges 43 and 45 of the pipe parts 40 and 42 in order to combine the connecting members 37 and 38 with the clamping jaws 32 and 33 into the clamping sleeve 30 by hooking-in the connecting members 37 and 38 at the hooks 35 of the two clamping jaws 32 and 33. For purposes of assembly of the clamping sleeve 30, one or possibly both bulges at the transition place into the band-shaped portion are contracted by means of a pincer in a known manner whereby the two clamping jaws 32 and 33 abut with their inclined inner surfaces against the also inclined flange walls of the pipe parts 40 and 42. The clamping sleeve 30 according to the present invention is thereby so conceived that with a sufficient contraction, the outer surfaces of the clamping jaws 32 and 33 come into abutment on the corresponding surfaces of the outer flange and are thereby slightly deformed outwardly within the fully elastic area of the side surfaces of the clamping jaws 32 and 33.

A completely satisfactory connection of the pipe parts 40 and 42 results in this manner. If one pipe part is to be exchanged, then one removes the clamping sleeve 30 in that one or possibly both ear-shaped bulges are cut open. A new pipe part is then connected with the old pipe part with the aid of two new connecting members 37 and 38 and with the use of the old clamping jaws 32 and 33.

The installation of a clamping sleeve with a one-piece ring 3 according to FIGS. 1 to 3 takes place in an analogous manner. During the assembly, the two clamping jaws 7 and 8 are spread apart slightly in order to be placed over the flanges 43 and 45 of the pipe parts 40 and 42. Subsequently, they are pressed together so far until the slots 25 to 28 fit over the hooks 17 to 20 whereupon the connecting member 5 is inserted. During this part of the assembly, the hinge portion 10 is stressed in bending both in the opening and closing direction. However, since it is annealed, it can withstand this stress without difficulty and without suffering any damage. After the assembly of the clamping sleeve, the U-shaped bulge 22 is also contracted in this case in the known manner whereupon the clamping sleeve or the clamping jaws 7 and 8 place themselves in the described manner about the flanges 43 and 45 of the pipe parts 40 and 42. During the interchanges, the ear-shaped bulge 22 is cut open and the assembly can be repeated with the same one-piece ring 3 and with a new connecting member 5 in the described manner.

FIG. 7 is a longitudinal cross-sectional view through a connection of pipes with large diameter, for example, of 100 mm synthetic plastic pipes or even larger.

Two pipe parts 50 and 51 are provided with flanges 53 and 54 at their ends to be connected. A sealing ring 56, for example, a rubber-elastic material is inserted between these flanges. A sleeve 57 is provided on the inside of the sealing ring 56 which, as can be seen from the drawing, extends over the connecting place. A four-partite clamping sleeve 58 with two clamping jaws 62 and 64 which are connected by means of two connecting members, of which one connecting member 60 is indicated in dash line, serves for the connection of the two pipes. Corresponding to the pipe diameter, the clamping sleeve ring may be subdivided into a still larger number of clamping jaws and connecting members. The basic principle of the connection in accordance with the present invention does not change thereby.

The possibility is offered thereby to connect also large diametric pipe parts by means of larger and therefore more expensive clamping sleeves whereby, however, the main part of the clamping sleeve, namely the one or multi-partite ring, can be re-used several times and only the connecting member with the bulge serving for the tightening has to be used as expendable material.

For the sake of completeness, a clamping sleeve 71 corresponding to FIG. 1, is illustrated in FIG. 8 which includes a one-piece ring 73, for example, of iron and a connecting member 75, preferably of stainless steel. Two clamping jaws 77 and 78 of the ring 73 are connected with each other by way of a hinge portion 80. In lieu of the hooks 17, 18, 19 and 20, slots 87 to 90 are provided in the ring 73 in this embodiment which correspond to the slots 25 and 28. A connecting member 91 is provided analogously with hooks 95 to 98. However, only one hook 95, 98 each may be provided at each end of the connecting member 91 and only one corresponding slot 87, 90 each may be provided in the ring 73. In principle, however, the construction and the use is that as explained with reference to FIG. 1.

It is additionally possible with the use of several connecting members to pre-assemble the same together with the clamping jaws in that after the insertion of the hooks into the slots, the hooks are retained in the slots by deformation. As a final step, the last connecting member has to be inserted or suspended only on one side in the clamping jaw for the purpose of holding fast at the object in order to form the endless or closed ring.

It is also possible in principle to utilize in lieu of solid clamping jaws individual profile members formed analogously to the jaws and to connect the same by means of a flat band whereby the latter is laterally guided and retained at the profile members by lateral, bent-in tabs. The flat band would again be completed into a closed ring by means of a connecting member.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An at least two-partite clamping sleeve for connecting two pipe ends provided with flanges comprising: an open ring means including internal lateral side surfaces for abutting at the pipe ends and inclined relative to the ring axis, a substantially cylindrical outer surface means connecting the inclined surfaces, and a center area including a bendable place acting as a stiff hinge which is constructed as an annealed portion of the outer surface means, the lateral surface means being interrupted in the area of the annealed portion, and at least one connecting means formed completely separately of said ring means to be a disposable member and including an ear-like bulge means which is contractable under permanent deformation for the purpose of tightening the clamping sleeve, free ends of the open ring means being provided with one of outwardly directed hook and slot means and the ends of the connecting means being provided with one of slot and hook means for engagement, respectively, with the one of said hook and slot means of the free ring ends, and wherein the connecting means consists of a connecting member made of considerably thinner material than the ring means.

* * * * *